(12) United States Patent  
Kasahara

(10) Patent No.: US 8,384,761 B2  
(45) Date of Patent: Feb. 26, 2013

(54) IMAGE PICKUP DEVICE FOR CORRECTING CHROMATIC ABERRATION BY SWITCHING A COORDINATE CONVERSION PARAMETER ACCORDING TO A TYPE OF LIGHT SOURCE OR ILLUMINATION LIGHT

(75) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 641 days.

(21) Appl. No.: 12/382,105

(22) Filed: Mar. 9, 2009

(65) Prior Publication Data  
US 2009/0231416 A1  Sep. 17, 2009

(30) Foreign Application Priority Data

Mar. 11, 2008 (JP) .................. 2008-061180

(51) Int. Cl.  
*H04N 7/00* (2011.01)
(52) U.S. Cl. ........................................ 348/36
(58) Field of Classification Search .............. 348/36, 348/211.8, 211.9, 272, 273, 335, 370; 359/662; 382/275  
See application file for complete search history.

(56) References Cited

U.S. PATENT DOCUMENTS

| | | | |
|---|---|---|---|
| 5,325,190 A | 6/1994 | Nagasaki et al. | |
| 7,245,319 B1 | 7/2007 | Enomoto | |
| 2006/0274170 A1* | 12/2006 | Azuma | 348/246 |
| 2007/0146497 A1 | 6/2007 | Yamamoto | |

FOREIGN PATENT DOCUMENTS

| | | |
|---|---|---|
| EP | 1523172 A | 4/2005 |
| JP | 2003-333606 | 11/2003 |
| JP | 2005-159918 | 6/2005 |
| JP | 2006-345053 | 12/2006 |
| JP | 2006-345054 | 12/2006 |
| JP | 2006-345055 | 12/2006 |
| JP | 2006-345056 | 12/2006 |
| JP | 2007-158628 | 6/2007 |
| JP | 2008-219328 | 9/2008 |
| WO | WO 95/15062 | 6/1995 |

OTHER PUBLICATIONS

Extended European Search Report dated Jul. 21, 2009 corresponding to Application No. 09250685.6-2202.  
Japanese Office Action dated Nov. 16, 2011 for Japanese Application No. 2008-061180.

\* cited by examiner

*Primary Examiner* — Robert B Harrell  
(74) *Attorney, Agent, or Firm* — Harness, Dickey & Pierce, P.L.C.

(57) ABSTRACT

An image pickup device includes an optical system having a wide angle, wherein at least magnification chromatic aberration is large; an image sensor configured to read an image picked up through the optical system; and a magnification chromatic aberration correction unit configured to perform magnification chromatic aberration correction by performing coordinate conversion on the image read by the image sensor. The magnification chromatic aberration correction unit includes plural coordinate conversion parameters used for the magnification chromatic aberration correction, and switches the coordinate conversion parameter used for the magnification chromatic aberration correction in the event that there is a change in a light source or an illumination light.

12 Claims, 12 Drawing Sheets

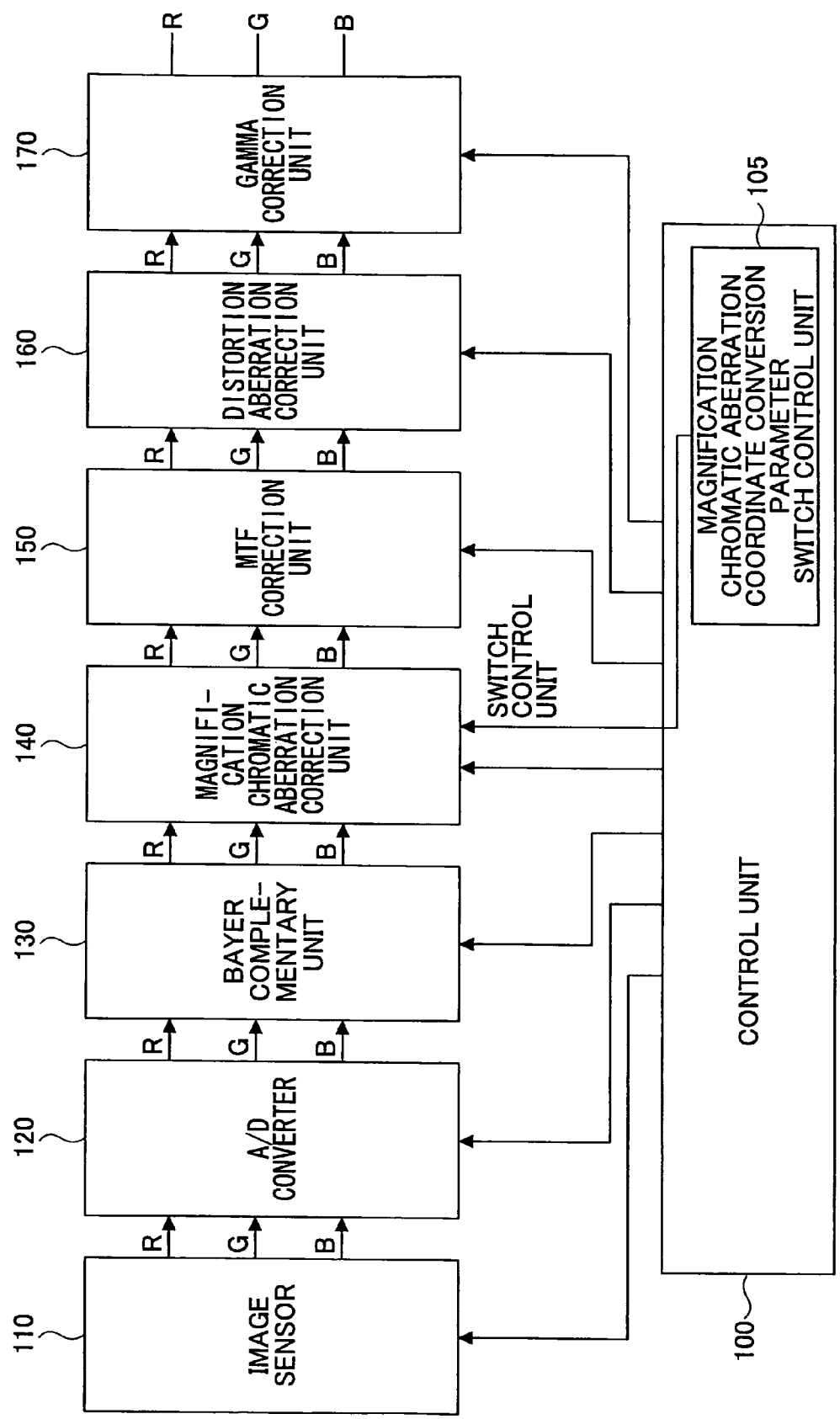

FIG.4

| 0 | −0.5 | 0 | −0.5 | 0 |
|---|---|---|---|---|
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

FIR FILTER

IMAGE PICKUP DEVICE FOR CORRECTING CHROMATIC ABERRATION BY SWITCHING A COORDINATE CONVERSION PARAMETER ACCORDING TO A TYPE OF LIGHT SOURCE OR ILLUMINATION LIGHT

BACKGROUND OF THE INVENTION

1. Field of the Invention

The present invention relates to an image pickup device, and more particularly to an image pickup device having a function for performing a process to correct the magnification chromatic aberration of an acquired image.

2. Description of the Related Art

In recent years and continuing, there are growing demands for wide-angle image pickup devices, such as those used as back monitors of vehicles. However, as the angle becomes wider, magnification chromatic aberration and distortion aberration increase. As a result, it will be difficult to design an optical system having small aberration. For this reason, the performance needs to be improved by combining image processing with the image pickup operation.

In the conventional technology, there are methods for correcting the aberration of an image device including an optical system having magnification chromatic aberration and distortion aberration. One example is a method of converting the coordinates of R (red), G (green), and B (blue) signals acquired with an image sensor such as a CCD or a CMOS sensor, which conversion is performed separately for each of the RGB components in subsequent stages. Accordingly, magnification chromatic aberration and distortion aberration are simultaneously corrected. In another method, the magnification chromatic aberration is ignored, and only the distortion aberration is corrected by having the coordinates of the RGB components converted together (see, for example, patent document 1). In this method, the coordinate conversion parameters are fixed.

Patent Document 1: Japanese Laid-Open Patent Application No. 2006-345054

In an image pickup device including an aberration correction process function, magnification chromatic aberration correction is performed on an image taken with an optical system having large magnification chromatic aberration. However, there have been cases where the image quality becomes degraded as a result of performing the magnification chromatic aberration correction, which is counter to the intended effect. For example, in the case of an in-vehicle camera, when the vehicle enters a tunnel, and the light sources in the tunnel are natrium lamps, the image quality becomes degraded as a result of the magnification chromatic aberration correction, which is counter to the intended effect. The same results are seen when various lights of the vehicle are turned on/off.

This is because the light sources (illumination lights) have different wavelength distributions (spectral). Accordingly, when the coordinate conversion parameter for the magnification chromatic aberration is set in correspondence with one of the wavelength distributions, and then the light changes to another light, the colors in the image may become blurred. Thus, to achieve images of higher quality when performing magnification chromatic aberration correction, the coordinate conversion parameter for the magnification chromatic aberration correction needs to be changed in accordance with the spectral of the illumination light. However, in the conventional technology, the coordinate conversion parameter is fixed, and therefore when the light source or the illumination light changes, the image quality inevitably becomes degraded as a result of the magnification chromatic aberration correction, which is counter to the intended effect.

SUMMARY OF THE INVENTION

The present invention provides an image pickup device in which one or more of the above-described disadvantages are eliminated.

A preferred embodiment of the present invention provides an image pickup device such as an in-vehicle camera with which high quality images can be obtained when performing magnification chromatic aberration correction on images taken with an optical system having high magnification chromatic aberration, by preventing degradation in the image quality caused by changes in the light source or the illumination light.

According to an aspect of the present invention, there is provided an image pickup device including an optical system having a wide angle, wherein at least magnification chromatic aberration is large; an image sensor configured to read an image picked up through the optical system; and a magnification chromatic aberration correction unit configured to perform magnification chromatic aberration correction by performing coordinate conversion on the image read by the image sensor, wherein: the magnification chromatic aberration correction unit includes plural coordinate conversion parameters used for the magnification chromatic aberration correction, and switches the coordinate conversion parameter used for the magnification chromatic aberration correction in the event that there is a change in a light source or an illumination light.

According to one embodiment of the present invention, an image pickup device such as an in-vehicle camera having a function for performing a magnification chromatic aberration correction process is provided, with which high quality images can be obtained when performing magnification chromatic aberration correction on images, by preventing degradation in the image quality caused by changes in the light source or the illumination light.

BRIEF DESCRIPTION OF THE DRAWINGS

Other objects, features and advantages of the present invention will become more apparent from the following detailed description when read in conjunction with the accompanying drawings, in which:

FIG. 1 is a functional block diagram of an example of an image pickup device according to an embodiment of the present invention;

FIG. 4 illustrates an example of an FIR filter;

DETAILED DESCRIPTION OF THE PREFERRED EMBODIMENTS

Figure 2A:
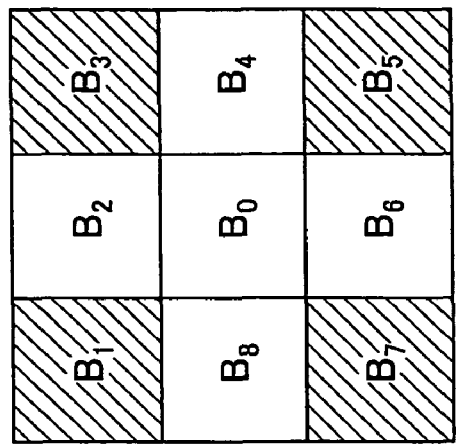
FIGS. 2A through 2C illustrate color filters of the Bayer array.

A description is given, with reference to the accompanying drawings, of embodiments of the present invention.

The present embodiment describes an image pickup device for taking an image of a subject with the use of an optical system having large magnification chromatic aberration and large skew aberration at a wide field angle. In the present embodiment, an image processing system performs distortion aberration correction in addition to magnification chromatic aberration correction; however, the main feature of the present invention is magnification chromatic aberration correction. The image can be any image as long as it is taken with the use of an optical system having a wide field angle, in which at least the magnification chromatic aberration is large. Furthermore, the color components of the image are three primary colors of red (R), green (G), and blue (B) in the following description. However, the color components may be three subtractive primary colors of yellow (Y), magenta (M), and cyan (C).

FIG. 1 is a functional block diagram of an example of an image processing system in an image pickup device according to an embodiment of the present invention. The image pickup device also includes an operations unit, an image storage unit, and an image display unit, although not shown in FIG. 1. The image pickup device is assumed to be used as an in-vehicle camera; although the purpose of the image pickup device is not so limited (may be an in-store camera, etc.).

In FIG. 1, a control unit 100 controls the operations of the units in the image pickup device in a pipeline-like manner by providing necessary control signals (clocks, horizontal/vertical synchronization signals, etc.) to the units in the image pickup device. The control unit 100 includes a magnification chromatic aberration coordinate conversion parameter switch control unit 105, so that when the light source or the illumination light changes, a switch control signal for switching the coordinate conversion parameter for the magnification chromatic aberration correction is sent to a magnification chromatic aberration correction unit 140. The magnification chromatic aberration coordinate conversion parameter switch control unit 105 may be provided separately from the control unit 100.

An image sensor 110 is, for example, a CCD or a CMOS sensor for converting an optical image, which has been taken with the use of an optical system (not shown) having large magnification chromatic aberration and large distortion aberration at a wide angle, into electric signals (image signals). The image sensor 110 is provided with a color filter of the Bayer array. RGB image data of the Bayer array is sequentially output based on coordinate values (x, y) received from the control unit 100. The coordinate values (x, y) supplied to the image sensor 110 are also sequentially supplied to subsequent stages at delayed timings by the control unit 100. The coordinate values (x, y) can be generated inside the image sensor 110 based on input clocks, horizontal/vertical synchronization signals, etc., and can be sequentially supplied to subsequent stages from the image sensor 110.

An A/D converter 120 converts RGB image signals of the Bayer array which are the analog signals output from the image sensor 110, into digital signals, and sends the resultant digital signals to a Bayer complementary unit 130. The digital signals are expressed by, for example, 8 bits for each of R, G, and B. Generally, an AGC circuit is provided at a stage before the A/D converter 120, but is omitted in this example.

The Bayer complementary unit 130 receives RGB image data of the Bayer array which has been converted into digital signals. The Bayer complementary unit 130 performs linear complementation so that image data (pixel data) for all coordinate positions is separately generated for each of the colors of RGB. Then, the Bayer complementary unit 130 sends the image data to the magnification chromatic aberration correction unit 140.

Figure 2B:
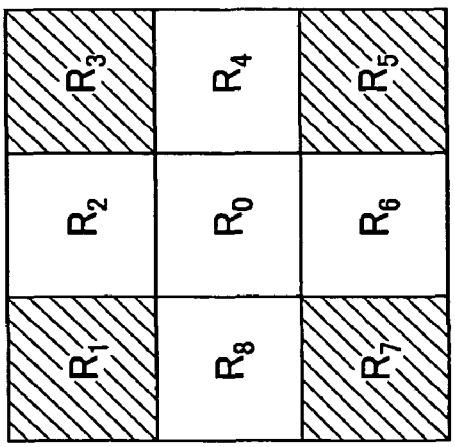
Figure 2C:
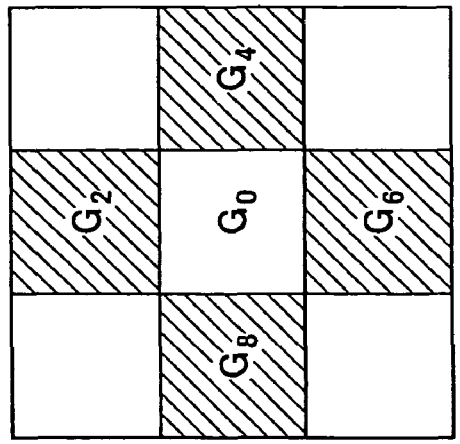

FIGS. 2A through 2C illustrate color filters of the Bayer array. $G_0$ is obtained by the following formula.

$$G_0=(G_2+G_4+G_6+G_8)/4 \tag{1}$$

Furthermore, $R_2$, $R_4$, $R_6$, $R_8$, $R_0$ are obtained by the following formulas.

$$R_2=(R_1+R_3)/2 \tag{2}$$

$$R_4=(R_3+R_5)/2 \tag{3}$$

$$R_6=(R_5+R_7)/2 \tag{4}$$

$$R_8=(R_1+R_7)/2 \tag{5}$$

$$R_0=(R_1+R_3+R_5+R_7)/4 \tag{6}$$

The method for obtaining $B_2$, $B_4$, $B_6$, $B_8$, $B_0$ is the same as that used for $R_2$, $R_4$, $R_6$, $R_8$, $R_0$, and is thus not further described.

In the present embodiment, a description is given of an image sensor having a color filter of the Bayer array. However, the same effects can be achieved with an image sensor having a color filter of another array such as a CMYG array or an RGB+Ir (infrared) array. Such an image sensor having a color filter array of four colors is more effective than an image sensor having a color filter array of three colors like RGB, because a memory of low latency or a four port RAM would be required for the magnification chromatic aberration correction.

The magnification chromatic aberration correction unit 140 receives the RGB image data which has undergone Bayer complementation. At the magnification chromatic aberration correction unit 140, coordinate conversion (magnification chromatic aberration coordinate conversion) is separately performed for each of the color components of R, G, and B with the use of a coordinate conversion formula such as a polynomial equation. The magnification chromatic aberration correction unit 140 outputs the RGB image data that has undergone magnification chromatic aberration correction. The magnification chromatic aberration correction unit 140 includes coordinate conversion parameter tables, which indicate associations between various light sources or illumination lights and coordinate conversion parameters (coordinate conversion coefficients). Based on a switch control signal from the magnification chromatic aberration coordinate conversion parameter switch control unit 105, the magnification chromatic aberration correction unit 140 selects a particular coordinate conversion parameter table, and switches the coordinate conversion parameter to be input in the coordinate conversion formula. A detailed description of the magnification chromatic aberration correction unit 140 is given below. For the coordinate conversion in magnification chromatic aberration correction, a memory having small size and low latency or a memory having small size and plural ports (SRAM, etc.) can be used. Furthermore, by switching the parameter used in the coordinate conversion formula in accordance with the light source or the illumination light, high-quality images can be constantly attained.

An MTF correction unit 150 receives the RGB image data that has undergone magnification chromatic aberration correction. At the MTF correction unit 150, an MTF correction process is performed on the RGB image data with the use of an FIR filter. The MTF correction unit 150 outputs the RGB image data which has undergone MTF correction.

Figure 3:
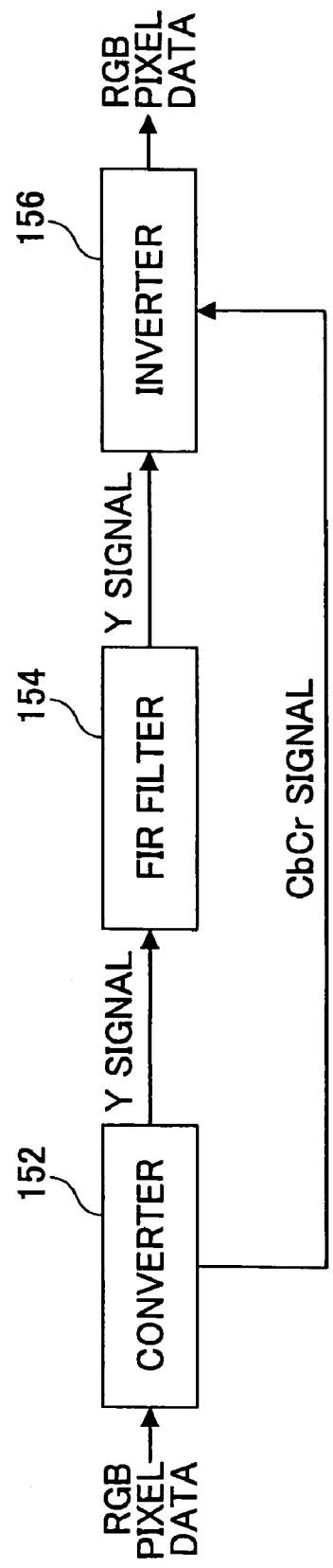
FIG. 3 is a schematic diagram of an MTF correction unit.

FIG. 3 is a schematic diagram of the MTF correction unit 150. A converter 152 converts the RGB image data into YCbCr pixel data with the following formulas.

$$Y = 0.299R + 0.587G + 0.114B \quad (7)$$

$$Cr = 0.500R - 0.419G - 0.081B \quad (8)$$

$$Cb = -0.169R - 0.332G + 0.500B \quad (9)$$

An FIR filter (5×5 filter) 154 receives only the Y luminance signals among the YCbCr signals, and performs a predetermined MTF correction process on the Y luminance signals. By performing the filtering (MTF correction) only on the Y signals, it is possible to achieve high-quality images in which amplification of color noise is mitigated. FIG. 4 illustrates an example of the FIR filter.

An inverter 156 receives the CbCr signals and the Y signals that have undergone MTF correction, inverts these signals by the following formulae, and outputs the RGB image data.

$$R = Y + 1.402Cr \quad (10)$$

$$G = Y - 0.714Cr - 0.344Cb \quad (11)$$

$$B = Y + 1.772Cb \quad (12)$$

A distortion aberration correction unit 160 receives the RGB image data that has undergone magnification chromatic aberration correction and MTF correction. The distortion aberration correction unit 160 performs the same coordinate conversion (distortion aberration coordinate conversion) on each of the color components of RGB with the use of a predetermined polynomial equation, and outputs the RGB image data that has undergone distortion aberration correction. For the coordinate conversion at the distortion aberration correction unit 160, it is possible to use a memory (DRAM, etc.) which has a larger size (corresponding to a maximum of one screen) than the memory for magnification chromatic aberration correction, but which has high latency because a single port will suffice. The coordinate conversion at the distortion aberration correction unit 160 is described in detail below.

A gamma correction unit 170 receives the RGB image data output from the distortion aberration correction unit 160, performs a predetermined gamma correction process with the use of look-up tables provided for each of RGB, and outputs the RGB image data that has undergone gamma correction. This image data output from the gamma correction unit 170 is sent to a display device (not shown) to be displayed on a monitor.

The above describes the overall operation of the image pickup device shown in FIG. 1 according to an embodiment of the present invention. The following is a detailed description of the magnification chromatic aberration correction unit 140 and the distortion aberration correction unit 160. First, a description is given of the principle of magnification chromatic aberration correction and distortion aberration correction.

Figure 5:
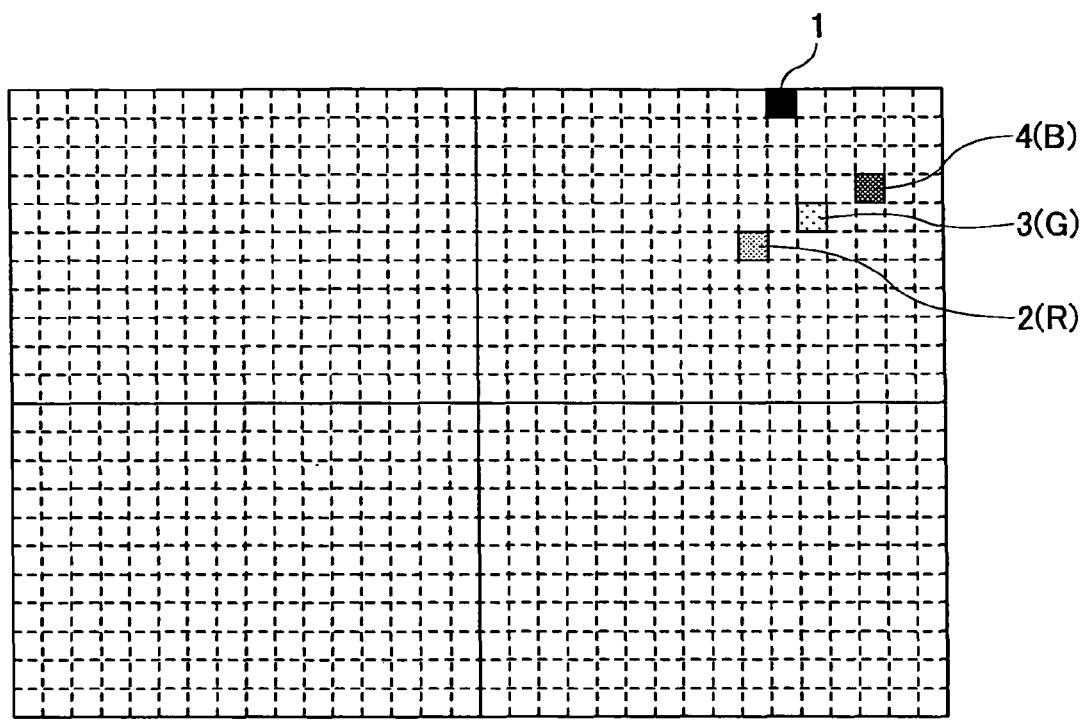
FIG. 5 is a diagram for describing magnification chromatic aberration and distortion aberration.

As schematically shown in FIG. 5, when an optical system having magnification chromatic aberration and distortion aberration is used to take an image, the image data (pixel data) at a position (pixel) denoted by 1 in the top right portion of the screen is displaced from this original position due to distortion aberration, and the respective color components RGB are displaced to different positions due to magnification chromatic aberration. Thus, in the image that is actually taken with an image sensor, the image at the position 1 is displaced to positions 2(R), 3(G), and 4(B). The correction of magnification chromatic aberration and distortion aberration can be performed by copying (moving) the image data items of the color components RGB at the positions (pixels) 2(R), 3(G), and 4(B), to the position (pixel) 1 which is the original position, i.e., by performing coordinate conversion. Hereinafter, the positions 2, 3, and 4 are referred to as coordinates of the coordinate conversion source, and the position 1 is referred to as the coordinate conversion destination.

The extent of distortion aberration and the extent of magnification chromatic aberration can be found in the design data of the optical system, and therefore it is possible to calculate the positions to which the color components RGB would be displaced.

Figure 6:
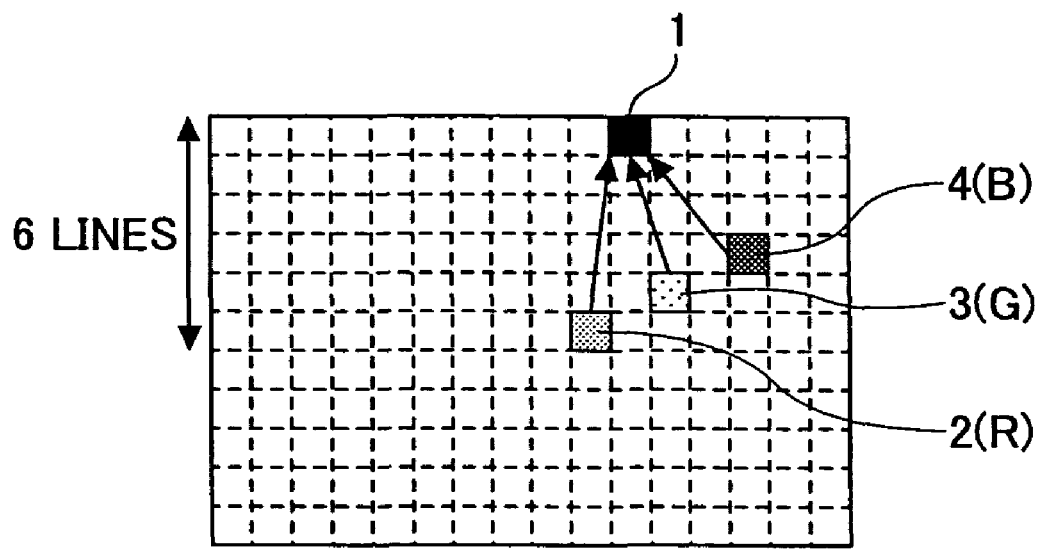
FIG. 6 schematically illustrates a method of simultaneously correcting magnification chromatic aberration and distortion aberration.

FIG. 6 schematically illustrates the method of simultaneously correcting magnification chromatic aberration and distortion aberration. Specifically, the image data items of the respective color components RGB at the positions (pixels) 2(R), 3(G), and 4(B) are moved to the position (pixel) 1 which is their original position. That is, magnification chromatic aberration and distortion aberration can be simultaneously corrected by performing coordinate conversion. However, this method requires a memory having large size for each of the color components RGB, and which has low latency or plural port cells. For example, in the case of FIG. 6, high-speed 6-line memory cells are required for each of the color components RGB to perform coordinate conversion. Furthermore, for each of the color components RGB, a coordinate conversion arithmetic circuit or a coordinate conversion table (LUT) is required.

Figure 7A:
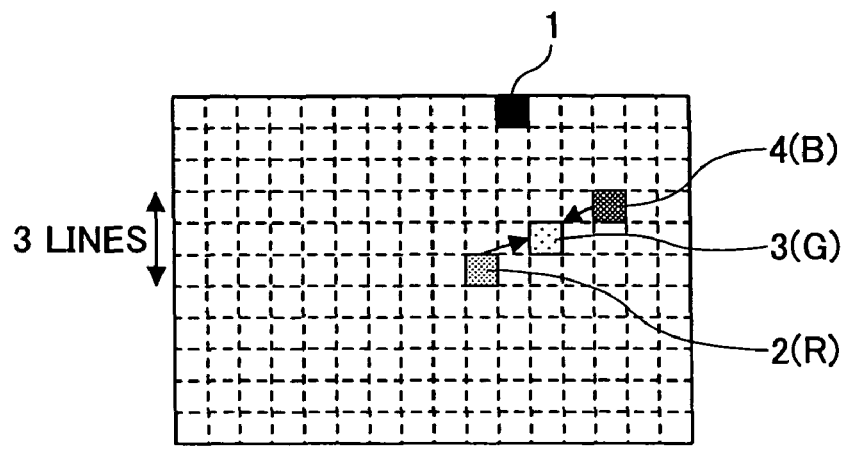
FIGS. 7A and 7B schematically illustrate a method of separately correcting magnification chromatic aberration and distortion aberration.
Figure 7B:
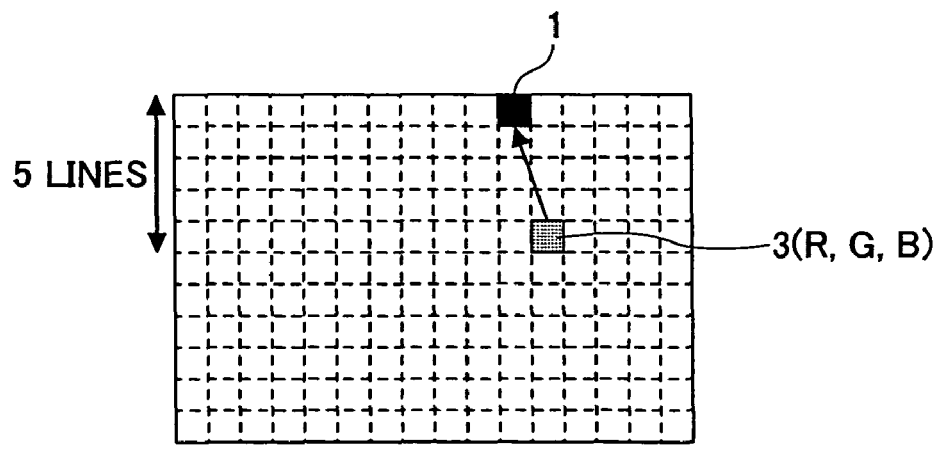

FIGS. 7A and 7B schematically illustrate a method of separately correcting magnification chromatic aberration and distortion aberration. The color components have different levels of magnification chromatic aberration, but the extent of displacement is small in this respect. Meanwhile, the color components have the same level of distortion aberration, but the extent of displacement is large in this respect. In light of these features, each image data item of the respective color components RGB is subjected to coordinate conversion to correct the magnification chromatic aberration. Then, all of the RGB image data items that have undergone magnification chromatic aberration correction are subjected to coordinate conversion, so that the distortion aberration is corrected. Accordingly, the memory used for coordinate conversion can be divided into a memory that is small-sized and high speed (low latency or plural ports) required for performing magnification chromatic aberration correction on each of the RGB color components, and a memory that is high capacity and low speed (high latency or single port) commonly required for performing distortion aberration on the RGB color components. Consequently, the overall cost can be reduced.

Furthermore, due to the magnification chromatic aberration, the R and B color components are generally displaced symmetrically with respect to each other with the G color component situated in the middle. Accordingly, the magnification chromatic aberration correction can be implemented by performing coordinate conversion only on the R and B color components, so that they are moved to the position of the G component. Thus, the coordinate conversion arithmetic circuit or the coordinate conversion table (LUT) is required only for the R and B color components. Consequently, the circuit scale can be reduced, and the overall cost can be further reduced.

FIG. 7A schematically illustrates the magnification chromatic aberration correction, where coordinate conversion is performed on the image data (pixel data) of the R and B components at the positions (pixels) 2(R) and 4(B), to move the components to the position (pixel) 3(G) corresponding to the G component. By performing this operation, the magnification chromatic aberration is corrected. FIG. 7B schematically illustrates distortion aberration correction, where coordinate conversion is collectively performed on the image data of the R, G, and B color components that have undergone the magnification chromatic aberration correction and that are located at the position (pixel) 3(G). As a result of this coordinate conversion, the image data of the R, G, and B color components is moved to the position (pixel) 1 which is the original (intended) position. By performing this operation, the distortion aberration is corrected.

In the example shown in FIGS. 7A and 7B, a three line memory corresponding to RGB will suffice as the high speed memory for magnification chromatic aberration correction. Furthermore, although the distortion aberration correction requires a five line memory, a low speed memory commonly used for RGB will suffice. Therefore, compared to the case of FIG. 6, the overall cost can be reduced. Furthermore, the coordinate conversion arithmetic circuit or the coordinate conversion table (LUT) used for the magnification chromatic aberration is only required for the R and B color components. Consequently, the overall cost can be further reduced.

The distortion aberration in this case means the distortion of the lens with respect to the target projection method. For example, the target projection method may be for obtaining an image viewed from the top by the camera, or for enlarging a part of the image.

Figure 8:
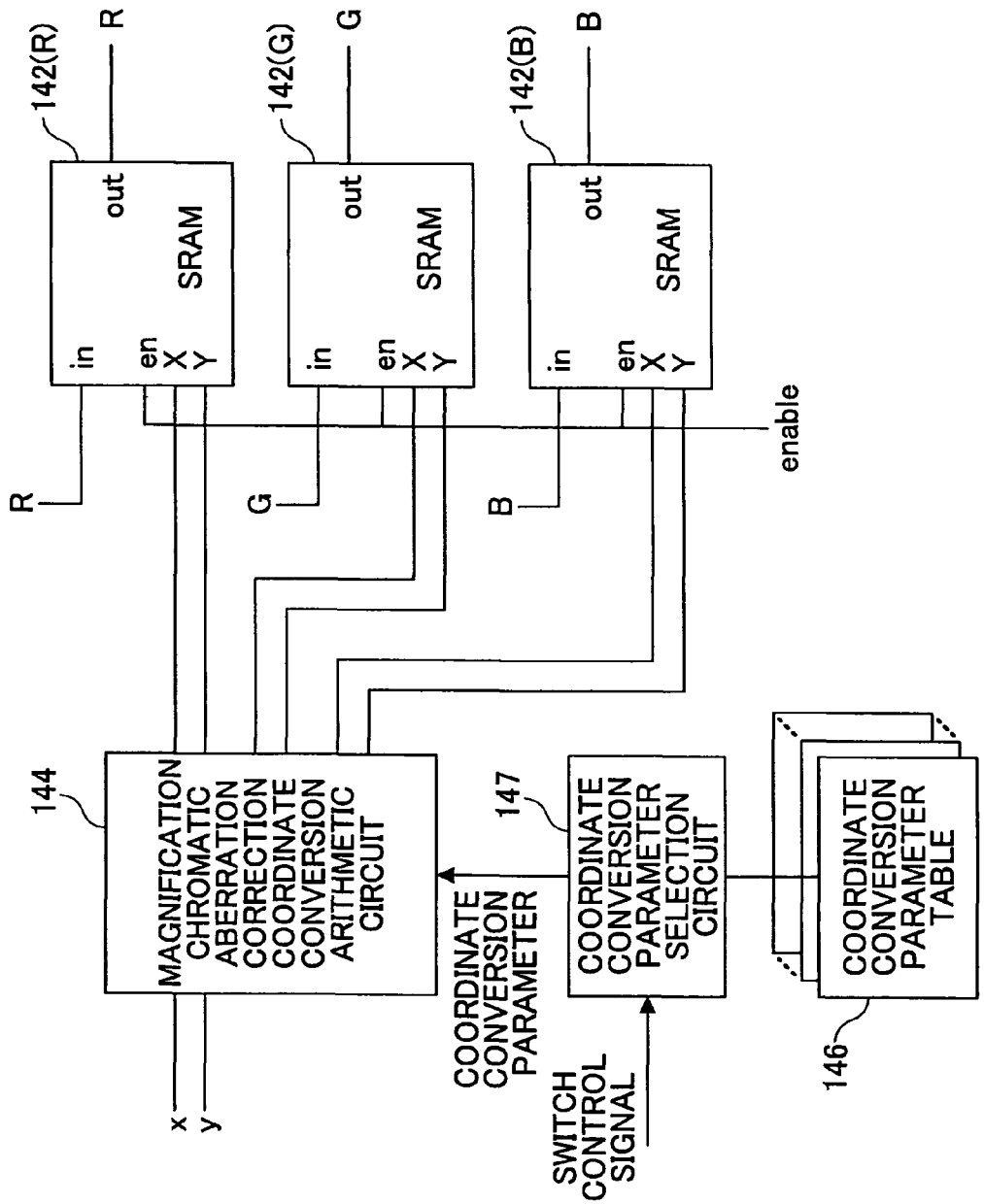
FIG. 8 illustrates an embodiment of a magnification chromatic aberration correction unit.

FIG. 8 illustrates an embodiment of the magnification chromatic aberration correction unit 140. A coordinate conversion memory for magnification chromatic aberration correction (line buffer) is denoted by 142, where 142(R), 142(G), and 142(B) correspond to the R, G, and B color components, respectively. A coordinate conversion arithmetic circuit for magnification chromatic aberration is denoted by 144, which is for calculating the conversion coordinates to perform magnification chromatic aberration correction for each of RGB (actually only for R and G). Coordinate conversion parameter tables are denoted by 146, which are for holding parameters (coordinate conversion coefficients) used in the coordinate conversion formula. There are plural coordinate conversion parameter tables 146 corresponding to various light sources and illuminance lights. A coordinate conversion parameter selection circuit is denoted by 147, which is for selecting a predetermined coordinate conversion parameter table based on a switch control signal from the magnification chromatic aberration coordinate conversion parameter switch control unit 105, and sending a coordinate conversion parameter to the magnification chromatic aberration correction coordinate conversion arithmetic circuit 144.

The magnification chromatic aberration correction requires, as a line buffer, a memory of small size but one which includes three ports for RGB, or a memory of low latency. In this example, it is assumed that the maximum amount of displacement due to magnification chromatic aberration is 20 lines in the Y direction, and therefore each of the coordinate conversion memories for magnification chromatic aberration correction 142(R), 142(G), and 142(B) is an SRAM corresponding to 20 lines. The size in the X direction determined based on the resolution. For example, if the resolution is VGA (640×480), the size in the X direction is 640 dots. If the color depth is RGB 8 bits, the data is written in/read out in units of 8 bits from each of the coordinate conversion memories for magnification chromatic aberration correction 142(R), 142(G), and 142(B).

As described above, each of the coordinate conversion memories for magnification chromatic aberration correction 142(R), 142(G), and 142(B) is small-sized, and therefore preferably has a memory region corresponding to 20 lines, with the use of a three port SRAM provided inside an image processing chip in the image pickup device. In a case of a memory of low latency such as SRAM, a one-port memory may be used as a three-port memory by time-sharing the memory.

The RGB image data in a pick-up image with magnification chromatic aberration and distortion aberration is sequentially written into the coordinate conversion memories for magnification chromatic aberration correction 142(R), 142(G), and 142(B) starting from the leading line in accordance with the respective coordinates (x, y). When the image data corresponding to 20 lines is written in, the image data is sequentially discarded starting from the leading line, and instead, new image data is written into the trailing line. Accordingly, the RGB image data, corresponding to a maximum of 20 lines required for the magnification chromatic aberration correction coordinate conversion, is sequentially stored in the coordinate conversion memories for magnification chromatic aberration correction 142(R), 142(G), and 142(B), respectively.

The coordinate values (x, y) indicate the position where to start reading the pick-up image corresponding to one frame. Meanwhile, each of the coordinate conversion memories 142(R), 142(G), and 142(B) is a line buffer corresponding to 20 lines, and the line used for writing in the data changes cyclically, and therefore, the coordinate values (x, y) cannot be directly used as the writing address for the coordinate conversion memories 142(R), 142(G), and 142(B). For this reason, there is a need for a configuration for converting the coordinate values (x, y) into the real addresses of the coordinate conversion memories 142(R), 142(G), and 142(B), but such a configuration is omitted from FIG. 8. The same applies to the relationship between the coordinate values (X, Y) after conversion in the reading operation described below, and the reading addresses of the coordinate conversion memories 142(R), 142(G), and 142(B).

The magnification chromatic aberration correction coordinate conversion arithmetic circuit 144 receives the input coordinate values (x, y), which are the coordinate conversion destination coordinates, and calculates the conversion coordinates for magnification chromatic aberration correction for each of RGB with a predetermined coordinate conversion formula such as a polynomial equation, and outputs coordinate values (X, Y), which are the coordination conversion source coordinates for each of RGB. As shown in FIG. 7A, in the magnification chromatic aberration correction, only the R and B color components undergo the coordinate conversion so that they are moved to the position of the G color component. Accordingly, as for the G color component, the magnification chromatic aberration correction coordinate conversion arithmetic circuit 144 directly outputs the input coordinate values (x, y) as the coordinate values (X, Y) after conversion, and as for each of the R and B color components, the magnification chromatic aberration correction coordinate conversion arithmetic circuit 144 converts the input coordinate values (x, y) into the coordinate values (X, Y) with the use of a predetermined coordinate conversion formula, and outputs the coordinate values (X, Y) after conversion. This operation is repeated for each of the coordinate values (x, y).

The following is an example of a coordinate conversion formula (13), assuming that the center of the screen is the origin:

$$X=x+[a(1)+a(2)\times abs(x)+a(3)\times abs(y)+a(4)\times y2]\times x$$

$$Y=y+[b(1)+b(2)\times abs(y)+b(3)\times abs(x)+b(4)\times x2]\times y$$

where abs( ) is an absolute value and a(1)~a(4), b(1)~b(4) are coordinate conversion parameters (coordinate conversion coefficients).

The coordinate conversion parameters are held in advance in the coordinate conversion parameter tables 146. As described above, there are plural coordinate conversion parameter tables 146 in accordance with the kinds of light sources and illumination lights. For example, the parameter values of a(1)~a(4), b(1)~b(4) are obtained as follows. For each of the light sources and illumination lights, magnification chromatic aberration correction simulation is repeated with different parameter values, the value at which color blurring in the image is minimum is obtained, and the obtained value is stored in association with a light source ID in the coordinate conversion parameter table 146 in advance. When a light source of a single spectral is used as the illumination light, "zero" can be set as the parameter values of a(1)~a(4), b(1)~b(4) in one of the coordinate conversion parameter tables 146, in order to turn OFF the magnification chromatic aberration correction function.

Furthermore, in recent years and continuing, various LED lamp light sources are becoming pervasive. To obtain a white light source with LED, there is a method of sequentially radiating R, G, and B LEDs by time division. In this case, the parameters (including the coordinate conversion parameter for R, the coordinate conversion parameter for G, and the coordinate conversion parameter for B) are switched in accordance with the radiation timings, so that high-quality images can be obtained. For this purpose, coordinate conversion parameter tables 146 holding the coordinate conversion parameter for R, the coordinate conversion parameter for G, and the coordinate conversion parameter for B may be further provided.

A high-sensitive monochrome image sensor can be used to allocate signals from the image sensor to R, G, and B channels at the radiation timings of R, G, and B to obtain a color image. In this case also, the parameters are switched in accordance with the radiation timings, so that high-quality images can be obtained, where the parameters include the coordinate conversion parameter for R, the coordinate conversion parameter for G, and the coordinate conversion parameter for B. For this purpose, coordinate conversion parameter tables 146 holding the coordinate conversion parameter for R, the coordinate conversion parameter for G, and the coordinate conversion parameter for B may be further provided.

As described above, the magnification chromatic aberration coordinate conversion parameter switch control unit 105 sends a predetermined switch control signal to the coordinate conversion parameter selection circuit 147 when the light source or the illumination light changes. The magnification chromatic aberration coordinate conversion parameter switch control unit 105 sends out the switch control signal at a timing when a switching operation is performed on the illumination light of a vehicle, a timing when the stop lamps of the vehicle are switched ON/OFF, or a timing when the rear lights of the vehicle are switched ON/OFF. In a case of a light source which is turned on by sequentially turning on LEDs of RGB by time division, the switch control signals of the coordinate conversion parameters for RGB are sent out at the respective radiation timings of RGB. Furthermore, in a case where a color image is obtained with the use of a high-sensitive monochrome image sensor, signals from the image sensor are allocated to R, G, and B channels at the radiation timings of R, G, and B, respectively, so that the switch control signals for the coordinate conversion parameters of RGB are sent out at the radiation timings of RGB in a similar manner as above.

Referring back to FIG. 8, the coordinate conversion parameter selection circuit 147 selects the predetermined coordinate conversion parameter table 146 based on the switch control signal from the magnification chromatic aberration coordinate conversion parameter switch control unit 105, and sends the corresponding coordinate conversion parameter to the magnification chromatic aberration correction coordinate conversion arithmetic circuit 144. Under normal circumstances (default), the coordinate conversion parameter selection circuit 147 is set so as to select the coordinate conversion parameter table 146 holding the coordinate conversion parameter corresponding to sunlight (natural light).

The magnification chromatic aberration correction coordinate conversion arithmetic circuit 144 receives the coordinate values (x, y) which are coordinate conversion destination coordinates and the coordinate conversion parameter selected by the coordinate conversion parameter selection circuit 147, uses the coordinate conversion formula (13) to calculate the coordinate values (X, Y) for each of RGB (actually only RB), and outputs the coordinate values (X, Y) which are coordinate conversion source coordinates.

The coordinate conversion memories 142(R), 142(G), and 142(B) sequentially read out the RGB image data based on the coordinate values (X, Y) output from the magnification chromatic aberration correction coordinate conversion arithmetic circuit 144 (actually, address values converted from the coordinate values (X, Y)), in parallel with the above-described writing operation (actually delayed by a certain amount of time). In this case, in the coordinate conversion memory 142(G), the G color component image data is read out from the same position where it was written in. Meanwhile, in the coordinate conversion memories 142(R) and 142(B), the RB color component image data is read out from the positions that are displaced from the positions where they were written in, i.e., read out from the displaced positions in correspondence with the magnification chromatic aberration.

By performing the above process, the coordinate conversion memories 142(R), 142(G), and 142(B) output RGB image data, respectively, which has undergone magnification chromatic aberration correction. Specifically, the RGB image data corresponding to the coordinate conversion source coordinate values (X, Y) is output as RGB image data corresponding to the coordinate conversion destination coordinate values (x, y). The coordinate conversion parameter for magnification chromatic aberration correction is switched in correspondence with the light source or the illumination light during the magnification chromatic aberration correction, thereby preventing degradation in the image quality during the magnification chromatic aberration correction and attaining high-quality images.

Figure 9:
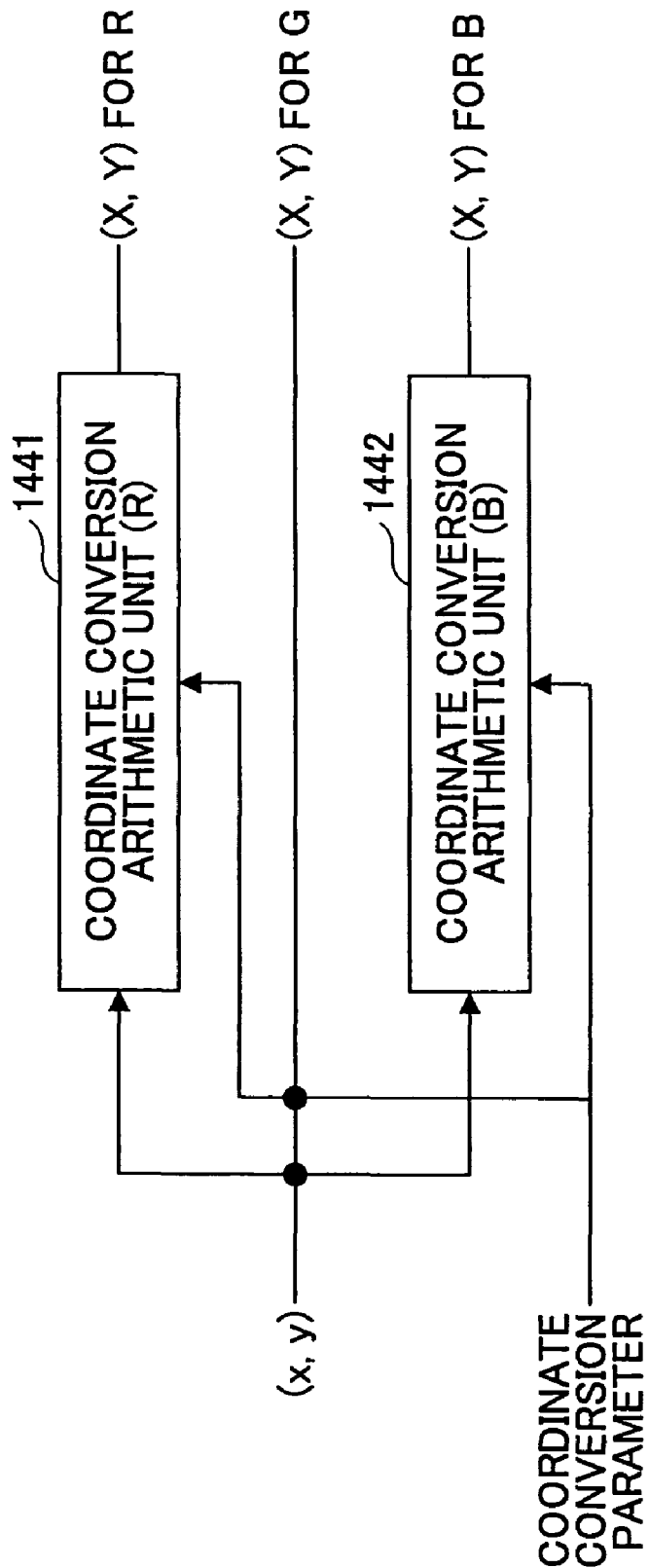
FIG. 9 illustrates a first example of a magnification chromatic aberration correction coordinate conversion arithmetic circuit.
Figure 10:
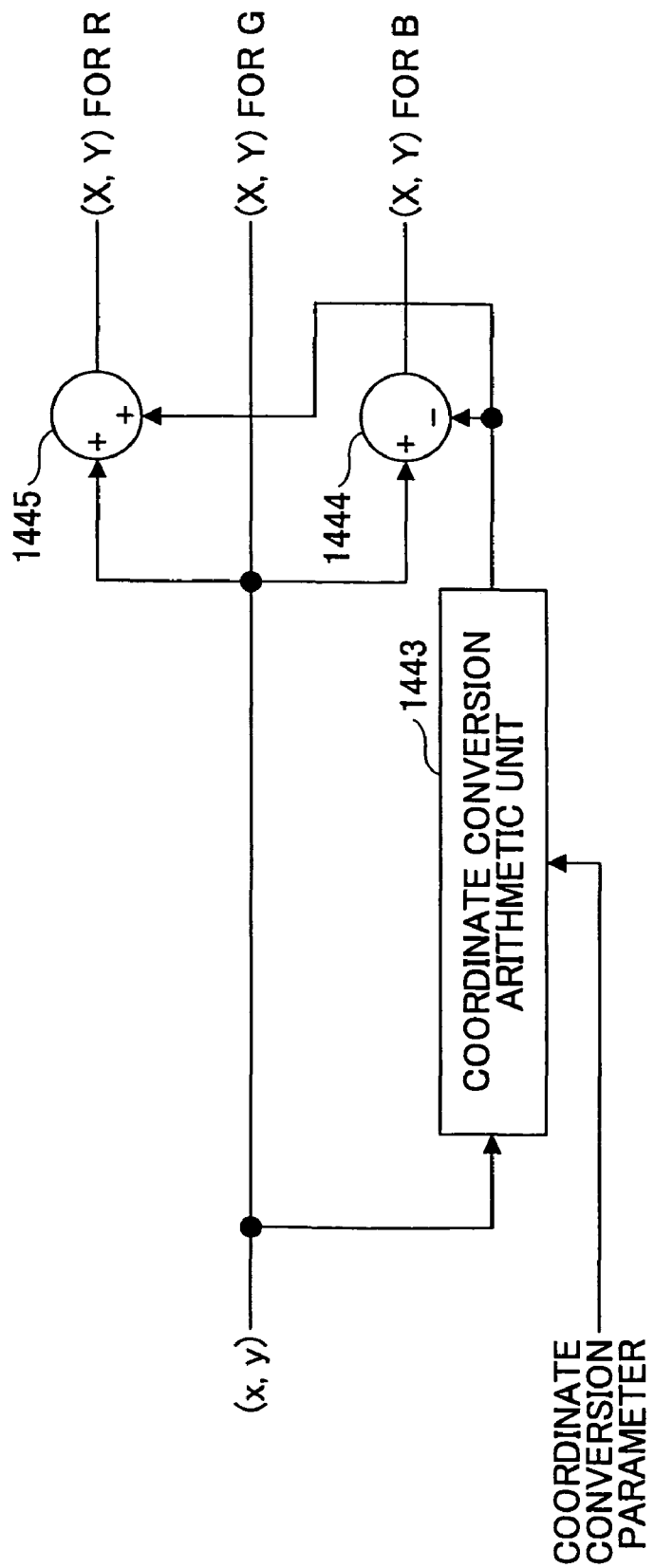
FIG. 10 illustrates a second example of the magnification chromatic aberration correction coordinate conversion arithmetic circuit.
Figure 11:
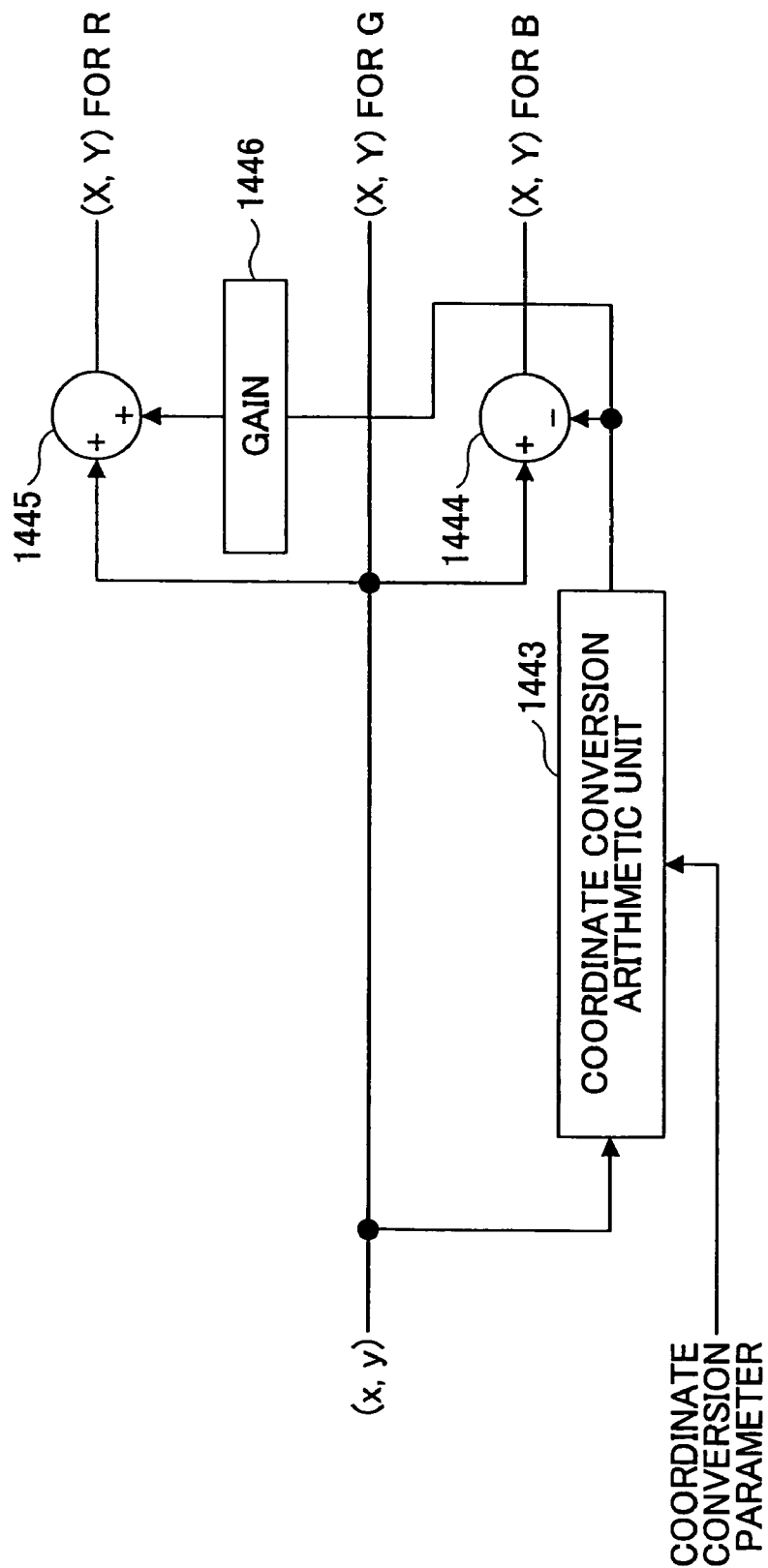
FIG. 11 illustrates a third example of the magnification chromatic aberration correction coordinate conversion arithmetic circuit.

FIGS. 9 through 11 illustrate several configurations of the magnification chromatic aberration correction coordinate conversion arithmetic circuit 144. In this description, the G color component is used as the reference; however, R or B may be used as the reference instead.

In the embodiment illustrated in FIG. 9, the G color component does not undergo coordinate conversion, and therefore the input coordinate values (x, y) are directly output as the G coordinate values (X, Y) corresponding to the coordinate conversion source. Only for the color components of R and B, the input coordinate values (x, y) are converted by coordinate conversion arithmetic units 1441, 1442 with the use of the formula (13), to output R coordinate values (X, Y) and B coordinate values (X, Y) which are coordinate conversion source coordinates. A coordinate conversion arithmetic unit only needs to be provided for the R component and the B component, and therefore the circuit scale can be small.

FIGS. 10 and 11 illustrate embodiments which take into consideration the feature that the R and B color components are generally substantially displaced symmetrically with respect to each other with the G color component situated in the middle (see FIG. 7A). In FIG. 10, a coordinate conversion arithmetic unit 1443 obtains the correction amount (displacement amount) for the coordinate values (x, y). A subtraction unit 1444 obtains the B coordinate values (X, Y) by subtracting the correction amount from the coordinate values (x, y). An addition unit 1445 obtains the R coordinate values (X, Y) by adding the correction amount to the coordinate values (x, y) Similar to the embodiment of FIG. 9, the G coordinate values (x, y) are directly output as the G coordinate values (X, Y). In FIG. 11, the displacement of the symmetric positions is also taken into consideration, and the correction amount for R is adjusted with a gain circuit 1446. The gain circuit can be provided on the B side. According to the embodiments illustrated in FIGS. 10 and 11, only one coordinate conversion arithmetic unit is needed, and therefore the circuit scale can be further reduced.

Figure 12:
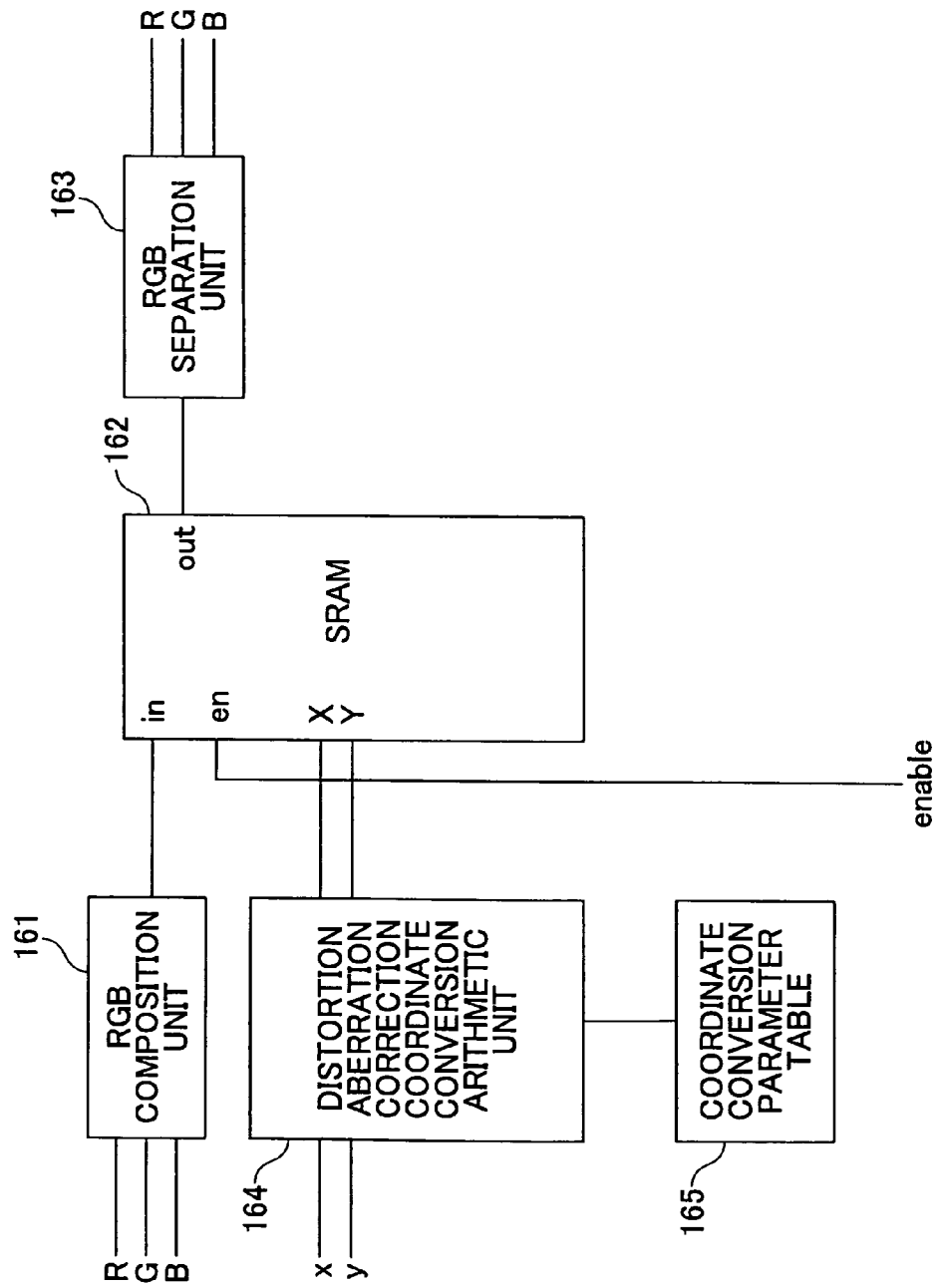
FIG. 12 illustrates a distortion aberration correction unit according to an embodiment of the present invention.

FIG. 12 illustrates an embodiment of the distortion aberration correction unit 160. The distortion aberration correction unit 160 shown in FIG. 12 includes an RGB composition unit 161 for combining together the three image data items of RGB, a distortion aberration correction coordinate conversion memory 162 which is commonly used for the RGB data, an RGB separation unit 163 for separating the combined RGB image data into the original color components, a distortion aberration correction coordinate conversion arithmetic unit 164 for calculating the conversion coordinates for making the distortion aberration correction with a predetermined coordinate conversion formula, and coordinate conversion parameter tables 165 for holding coordinate conversion parameters to be input to the coordinate conversion formula.

When pixels are displaced due to distortion aberration, the displacement amounts are large. Therefore, a buffer memory capable of storing the image data corresponding to a maximum of one screen is required for the distortion aberration correction process. Meanwhile, the displacement amount is the same for the respective RGB components, and therefore only one buffer memory having a total bit width corresponding to the RGB image data will suffice. In this example, the resolution is VGA (640×480), and the number of bits (color depth) of each of the RGB image data items is 8 bits, and the coordinate conversion memory 162 is DRAM of 640×480 dots where the writing/reading is performed in units of 24 bits.

As described above, the coordinate conversion memory 162 needs to have an extremely large size. Therefore, it is difficult in terms of cost to provide it as SRAM inside the image processing chip. In addition, a memory of one port will suffice for RGB. Accordingly, DRAM is preferably provided external to the image processing chip.

The RGB composition unit 161 sequentially receives the RGB image data items (each having 8 bits) which have undergone the magnification chromatic aberration correction, combines them into one image data item (24 bits), and outputs the resultant image data. The composite RGB image data is sequentially written into the coordinate conversion memory 162 starting from the leading line, in accordance with the respective coordinate values (x, y).

Meanwhile, the distortion aberration correction coordinate conversion arithmetic unit 164 receives the coordinate values (x, y) of the coordinate conversion destination, calculates the conversion coordinates for distortion aberration correction common to RGB with a predetermined coordinate conversion formula such as a polynomial equation, and outputs the coordinate values (X, Y) of the coordinate conversion source. It is possible to use the same coordinate conversion formula (13) as that used for magnification chromatic aberration correction. However, as a matter of course, different coordinate conversion parameters are used. The coordinate conversion parameters are held in advance in the coordinate conversion parameter tables 165.

As described above, the same coordinate conversion formula (13) as that used for the magnification chromatic aberration correction can be used for the distortion aberration correction. For the items $x^2$, $y^2$, abs(x), and abs(y) used in the formula (13), the calculation results obtained from the magnification chromatic aberration correction can be used (by saving the results in a memory). Therefore, there is no need to calculate these items once again. Accordingly, the distortion aberration correction coordinate conversion arithmetic unit 164 can have a small circuit scale.

The coordinate conversion memory 162 sequentially reads out the RGB composite image data based on the coordinate values (X, Y) output from the distortion aberration correction coordinate conversion arithmetic unit 164, in parallel with the above-described writing operation of the RGB composite image data (24 bits) (actually delayed by a certain amount of time). The RGB separation unit 163 separates the RGB composite image (24 bits) that has been read out from the coordinate conversion memory 162, into the original image data items (8 bits) corresponding to the respective color components of RGB.

By performing the above process, the respective RGB image data items that have undergone the magnification chromatic aberration correction and the distortion aberration correction are output from the RGB separation unit 163. Specifically, the respective RGB image data items are moved to their original (intended) positions (x, y).

It is possible to provide a look-up table (LUT) which is a table of association between the input coordinate values (x, y) and output coordinate values (X, Y). The coordinate values (X, Y) of the coordinate conversion source corresponding to the coordinate values (x, y) of the coordinate conversion destination can be directly acquired from the LUT. In this case, there is no need to perform calculations for the coordinate conversion, and the distortion aberration correction can be implemented basically with only a memory chip.

The present invention is not limited to the specifically disclosed embodiment, and variations and modifications may be made without departing from the scope of the present invention.

The present application is based on Japanese Priority Patent Application No. 2008-061180, filed on Mar. 11, 2008, the entire contents of which are hereby incorporated herein by reference.

What is claimed is:
1. An image pickup device comprising:
an optical system having a wide angle, wherein at least magnification chromatic aberration is large;
an image sensor configured to read an image picked up through the optical system; and a magnification chromatic aberration correction unit configured to perform magnification chromatic aberration correction by performing coordinate conversion on the image read by the image sensor, wherein:
the magnification chromatic aberration correction unit includes plural coordinate conversion parameters used for the magnification chromatic aberration correction, and switches a coordinate conversion parameter used for the magnification chromatic aberration correction in an event that there is a change in a light source or an illumination light, and
the coordinate conversion parameters are parameters that are used for coordinate conversion for correcting chromatic aberration that is caused according to a type of light source or illumination light.

2. The image pickup device according to claim 1, further comprising:
a control unit configured to detect the change in the light source or the illumination light, and output a switch control signal to switch the coordinate conversion parameter in the event that the change in the light source or the illumination light is detected, wherein:
the magnification chromatic aberration correction unit switches the coordinate conversion parameter used for the magnification chromatic aberration correction based on the switch control signal output from the control unit.

3. The image pickup device according to claim 2, wherein:
the control unit outputs the switch control signal when the light source flashes, wherein the light source sequentially flashes each of a plurality of color components.

4. The image pickup device according to claim 3, wherein:
the image sensor is a high-sensitive monochrome image sensor; and
a color image is obtained by allocating output from the image sensor to channels corresponding to the color components at timings when the color components are radiated.

5. The image pickup device according to claim 2, wherein:
the control unit outputs the switch control signal in accordance with a switch operation performed on an illumination light of a vehicle.

6. The image pickup device according to claim 2, wherein:
the control unit outputs the switch control signal when stop lamps of a vehicle are switched ON/OFF.

7. The image pickup device according to claim 2, wherein:
the control unit outputs the switch control signal when rear lights of a vehicle are switched ON/OFF.

8. The image pickup device according to claim 1, wherein:
the magnification chromatic aberration correction unit refrains from performing the coordinate conversion on an image corresponding to a particular color component, and performs the coordinate conversion only on an image corresponding to a color component other than the particular color component.

9. The image pickup device according to claim 8, wherein:
the magnification chromatic aberration correction unit obtains a correction amount based on a coordinate value of the image corresponding to the color component other than the particular color component, and performs the coordinate conversion on the image corresponding to the color component other than the particular color component based on the correction amount.

10. The image pickup device according to claim 9, wherein:
the magnification chromatic aberration correction unit adjusts the image corresponding to the color component other than the particular color component by multiplying the coordinate value by a predetermined gain.

11. The image pickup device according to claim 1, wherein:
the magnification chromatic aberration correction unit including coordinate conversion parameter tables, which indicate associations between various light sources or illumination lights and coordinate conversion parameters, and based on a switch control signal, the magnification chromatic aberration correction unit selects a particular coordinate conversion parameter table, and switches the coordinate conversion parameter to be input in a coordinate conversion formula.

12. The image pickup device according to claim 1, wherein:
the optical system has a magnification chromatic aberration large enough to cause R and B color components to be displaced symmetrically with respect to each other with the G color component situated in the middle, wherein the magnification chromatic aberration correction is implemented by performing coordinate conversion only on the R and B color components.

* * * * *

UNITED STATES PATENT AND TRADEMARK OFFICE
CERTIFICATE OF CORRECTION

| | | |
|---|---|---|
| PATENT NO. | : 8,384,761 B2 | Page 1 of 1 |
| APPLICATION NO. | : 12/382105 | |
| DATED | : February 26, 2013 | |
| INVENTOR(S) | : Ryosuke Kasahara | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this
Twenty-fifth Day of November, 2014

Michelle K. Lee
*Deputy Director of the United States Patent and Trademark Office*